United States Patent [19]

Nordling

[11] Patent Number: 4,514,825
[45] Date of Patent: Apr. 30, 1985

[54] HIGH SPEED DIGITAL MODEM

[75] Inventor: Karl I. Nordling, Largo, Fla.

[73] Assignee: Kinex Corporation, Largo, Fla.

[21] Appl. No.: 356,466

[22] Filed: Mar. 9, 1982

[51] Int. Cl.³ .......................... G06F 7/44; G06F 7/42
[52] U.S. Cl. ............................................ 364/900
[58] Field of Search ................... 375/9; 364/754, 757, 364/200 MS File, 900 MS File

[56] References Cited

U.S. PATENT DOCUMENTS

| | | | |
|---|---|---|---|
| 3,610,906 | 10/1971 | Stampler | 364/757 |
| 3,749,898 | 7/1973 | Logan | 364/757 |
| 4,085,449 | 4/1978 | Walsh et al. | 364/900 |
| 4,263,670 | 4/1981 | Sherman | 375/9 |
| 4,335,446 | 6/1982 | Gandini et al. | 375/9 X |

Primary Examiner—Harvey E. Springborn

Attorney, Agent, or Firm—Duckworth, Allen, Dyer, & Pettis

[57] ABSTRACT

A high speed processor for a digital modem which transmits and receives data over voice grade telephone lines, for performing logical addition and subtraction operations during encoding and decoding of data as phase shift keyed modulation. A quarter square multiplying circuit is provided which executes multiplying operations at high speed. A discrete-input multiplexer is provided and controlled to bring single-bit variables into the processor as word variables permitting logic operations to be performed rapidly and efficiently. A bitwise logic circuit is provided in conjunction with the multiplexer and the processor to perform logic operations on bit pairs within the same word or on pairs of bits from different locations in two different operands. An interrupt subsystem includes a toggle circuit which alternately monitors for transmit and receive interrupts.

16 Claims, 8 Drawing Figures

HIGH SPEED DIGITAL MODEM

BACKGROUND OF THE INVENTION

1. Field of the Invention

The present invention relates to data modems for transmitting and receiving data over a telephone line and more particularly to modems having a microprocessor to perform the required modulation, demodulation, filtering and control digitally.

2. Description of the Prior Art

It is well known to transmit digital data over voice grade telephone lines, satellite channels, microwave channels, and other band limited transmission paths by the use of data modems which encode binary data into a form capable of transmission over such communication channels, and for decoding the received signals from the channels. To obtain high data rates over band limited channels, it has been common to utilize efficient modulation systems such as differential phase shift keying (DPSK), a typical technique which may provide data rates up to 4800 bits per second. DPSK modulation may utilize an 1800 Hz carrier with 8 phases of the carrier coded to represent 3 data bits at a time. In the past, the encoding and modulation has been performed with large and relatively expensive analog circuits to provide the necessary processing, equalizing, and filtering to the desired accuracy. In recent years, modems have been developed in which the modulation and demodulation is accomplished by use of digital computations executed by microprocessors.

The digital approach permits the major elements of a modem to be implemented by large scale integration which greatly reduces the initial cost. The accuracy of the system is greatly improved by elimination of the lumped circuits and discrete components used in analog systems whose values can drift and which require close manufacturing tolerances. Typical microprocessor implemented data modems are disclosed in U.S. Pat. No. 4,263,670 to Sherman and U.S. Pat. No. 4,085,449 to Walsh, et al. However, an inherent problem in such prior art digital modems is the required speed of operation and expense of the processor's digital circuits. Where the various elements of the modem must be synthesized digitally; for example, transversal filters, scramblers and Grey code converters, trigonometric tables, equalizers and the like, and will require volatile and non-volatile storage of the data, the data storage devices must be addressed and utilized by the processor at very high speeds. For example, if a clock of 4.8 MHz is used, only 208 ns are available between clock pulses in which to perform all of the necessary digital operations required during that period. Therefore, in order to provide a digital modem capable of all the functions which can be obtained in an analog type modem, it is necessary to provide improved digital processing circuits that minimize the time and parts required for various operations. It is to this problem that the present invention is addressed.

SUMMARY OF THE INVENTION

The present invention, in its preferred application, provides 4800 bit per second data transmission and reception over voice grade telephone lines and similar band limited channels. Digital data is processed and encoded as 8 phase differential phase shift keying type modulation through the conventional process of encoding, separating the signal into quadrature components, modulating on an 1800 Hz carrier, combining the quadrature signals, converting from digital-to-analog signals and filtering for transmission. It is to be understood that all of the conventional operations above are synthesized through the use of various algorithms and look-up tables in the microprocessor system. A received DPSK signal is sampled and converted from analog to digital form. The inverse demodulation process is then accomplished digitally by the various algorithms and look-up tables in the microprocessor system, and the recovered digital data regenerated for data output.

The main element of the invention is the modem processor in which the various elements are connected between a D-bus and a Y-bus. A group of modem processor input devices feed data in 8-bit bytes, either serially or in parallel, into the D-bus for handling by the processor. Included are: analog-to-digital input circuits, control panel switches, configuration straps and electronic data processing (EDP) interface leads. A group of output devices are fed by the Y-bus and include digital-to-analog output circuits, control panel displays, and EDP interface leads.

The modem processor consists of an 8-bit register arithmetic logic unit (RALU), a 1024×32 program memory (P-ROM) with a 10-bit program address generator (PAG), an interrupt subsystem, a 512×8 coefficient read only memory (C-ROM), a 256×8 data random access memory (D-RAM), and a 16 bit squares memory and accumulator with 16 bit resolution. In addition, necessary decoders and gating to access the peripheral devices are provided. Of special note is the use of a discrete output feature which permits single output lines to be turned on and off with a single instruction according to the sign bit on the Y-bus. The discrete input multiplexer feature allows single input lines to be input into the RALU and to set an entire word to ZEROs or ONEs with a single instruction. The discrete input multiplexer is also used to bring in the state of a bitwise AND, a bitwise OR, and a bitwise EXCLUSIVE OR operator. These operate on the 8 bits of the Y-bus and are used to facilitate bitwise logic as will be explained in detail hereinafter.

The RALU of the microprocessor is preferably implemented by two 2901A four-bit microprocessor slicers as manufactured by Advanced Micro Devices, Inc. to provide 8 bit arithmetic in normal operation. Advantageously, when more precision is needed, double precision operators may be used to give an effective word length of 16 bits as is utilized in equalizer and filter routines.

The coefficient read only memory (C-ROM) is provided for non-volatile storage of various mathematical tables such as sines and cosines and Grey code information. A coefficient address register which receives instructions via the Y-bus addresses the C-ROM which delivers the requested information to the D-bus. The data random access memory is the main storage location for signal samples and other volatile type data and is preferably a 256×8 bit RAM with an access time of 60 ns. The D-RAM information is read into the RALU via the D-bus and the RALU writes into the D-RAM via the Y-bus. Either random addressing or sequential/displacement addressing may be selected for the D-RAM. The sequential displacement addressing scheme is a key element in facilitating efficient execution of typical signal-processing programs. A novel feature of the invention is the bitwise logic circuit. As is well known, microprocessors that have instruction sets containing logic operations use wordwise logic. Each bit in one operand is paired with the same bit in the other operand and the indicated operation performed on the two. Thus, the bits representing the logic variables to be operated on must necessarily be in the same location in both operands. Since this does not often occur automatically, a number of various shift operations must be performed and as a result, logic operations in prior art processors are awkward and time consuming. Advantageously, the present invention provides means for performing logic operations on bit pairs within the same word or on pairs of bits from different locations in two different operands and is referred to herein as bitwise logic.

As previously mentioned, a discrete-input multiplexer circuits combined with bitwise AND, OR and EXCLUSIVE OR gates is used to implement the bitwise logic feature. The three bitwise gates couple the AND, OR, and EXCLUSIVE OR functions on all the bits in the Y-bus into the discrete-input multiplexer circuits via three leads. The output of the discrete-input multiplexer circuits is a single lead which is connected to all of the inputs of an eight input tristate buffer with the eight output lines of the tristate buffer connected to the eight leads of the D-bus. Thus, when the tristate buffer is enabled, all of the bit lines in the D-bus take the state of the discrete-input multiplexer circuits output. Additionally, a number of external discrete-input multiplexer circuits leads are provided to the discrete input multiplexer which permits all of the bit leads in the D-bus to take on the state of a selected external discrete-input multiplexer circuits. The discrete-input multiplexer circuits is controlled by address codes from the P-ROM.

The bitwise logic can provide the AND function of any group of bits in a word by first wordwise ORing the word with a pattern which has ONES in all bit positions that are not to be included in the AND function. Similarly, the OR and EXCLUSIVE OR functions of any group of bits in a word can be formed by wordwise ANDing the word with a pattern that has ONES in all the bit positions that are to be included in the functions. These wordwise ORing and ANDing operations are available with most microprocessors. The value of such logic functions formed is available to the processor as a word with all ONEs or all ZEROs. This permits it to be added to or subtracted from another word which implies that the function has a numerical value of $-1$ when true and 0 when false. The value can also be loaded as all ZEROs or all ONEs into a register or operated on by one of the wordwise logic operations available in the processor.

The use of the bitwise logic reduces the number of steps required in many operations. For example, a general logic operation on single bits in words can be performed with five operations where wordwise logic operations could require up to thirteen steps. For cases where there is more than 1 bit per word involved, the number of steps in the usual wordwise logic is even greater.

The present invention also provides a multiply capability requiring less circuitry than prior digital multipliers. The multiplier uses the quarter square multiplying technique based on the formula $$A \cdot B = \frac{(A + B)^2 - (A - B)^2}{4}.$$

As mentioned earlier, a squares memory table is provided in which the size of the required look-up table is determined by the resolution of the digital numbers to be multiplied. In the present invention, a $512 \times 16$ memory is used. The squares memory is used in conjunction with a 16-bit adder/subtractor and an accumulator external to the RALU. The operations $A+B$ and $A-B$ involved in the quarter square multiplying algorithm are performed by the RALU. The operation $SS-DS$ ($SS=$sum squared, $DS=$difference squared) is performed by the accumulator and adder/subtractor. This is convenient since the accumulator is required anyway to perform the add-and-store operations inherent in digital filters. The quarter square mutliplier allows successive multiply and accumulate operations to be performed at the rate of one every 400 ns. As may now be understood, the present invention provides a microprocessor implemented high speed modem capable of handling 4800 bit per second data over band limited telephone voice channels and in which 8-phase DPSK is coded and decoded digitally. The modem by virtue of novel high speed logic circuits extends the efficiency and economy of prior art digital modems.

Therefore, it is a principal object of the present invention to provide a highly efficient and economical digital modem having a digital processor supplemented by associated logic circuits for accomplishing all modulation and demodulation operations digitally.

It is another object of the invention to provide a processor implemented data modem in which the multiplying operations are performed by the quarter square multiplier algorithm to reduce the circuitry required for such operations.

It is still another object of the invention to provide a processor implemented digital modem having a discrete input multiplexer controlled to bring single bit variables into the arithmetic unit of the processor as word variables to reduce the time required for such operations.

It is yet another object of the invention to provide a bitwise logic circuit for increasing the bit processing power of the microprocessor by performing logic operations on bit pairs within the same word or on pairs of bits from different locations in two different operands.

It is a further object of the invention to provide a processor implemented digital modem in which the processor includes an interrupt subsystem having a toggle circuit for alternately monitoring for transmit and receive interrupts.

It is still a further object of the invention to implement the toggle circuit by means of a flip-flop controlled from the receiving countdown circuits and the transmit countdown circuits to alternately sample the transmit and receive interrupt lines.

It is additionally an object of the invention to provide a microprocessor implemented digital modem which includes a data memory with random and sequential/displacement addressing capability to reduce the number of steps required in typical modem processing operations.

These and other advantages and objects of the invention will become apparent from the following detailed description and the drawings.

DETAILED DESCRIPTION OF THE PREFERRED EMBODIMENT

Figure 1:
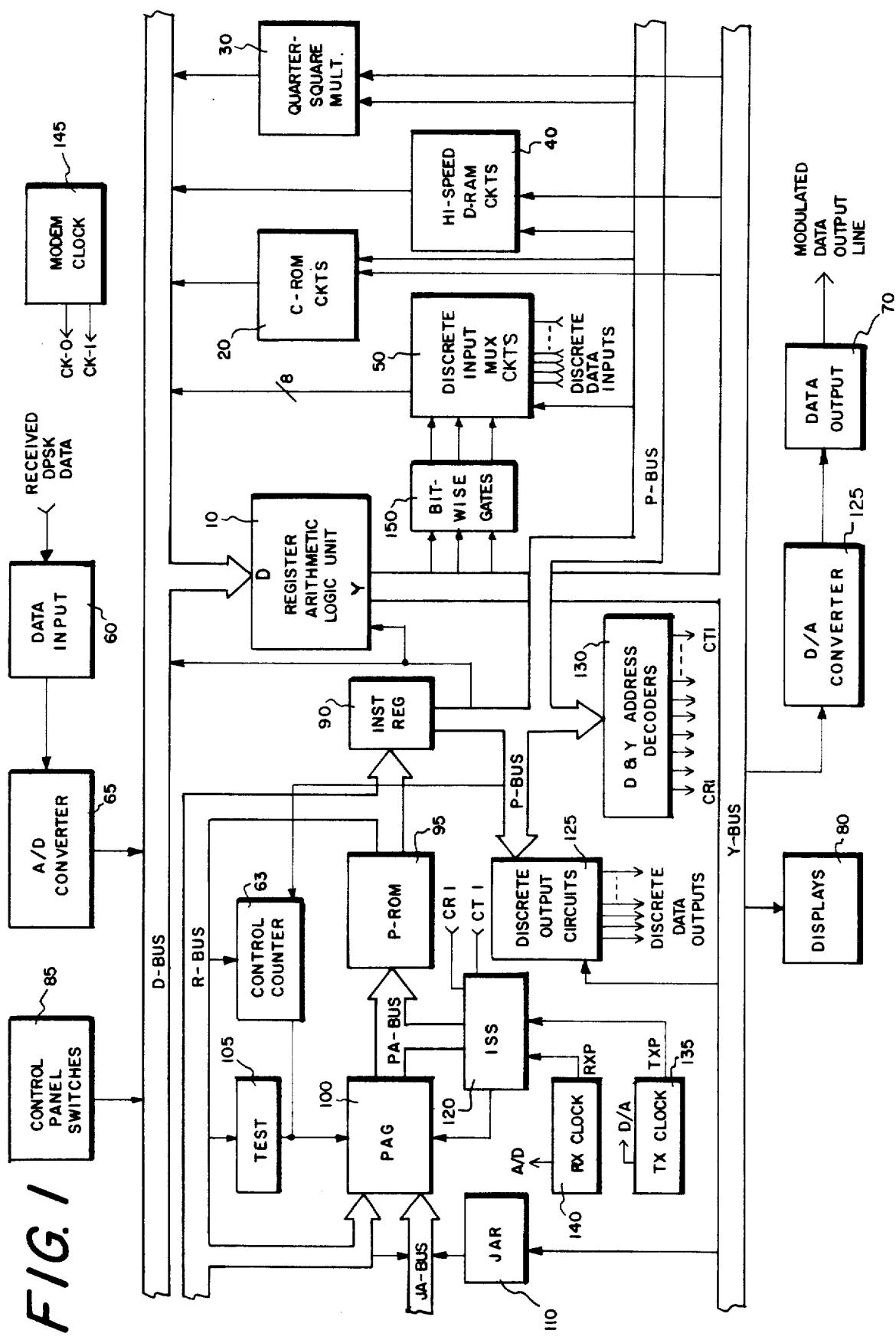
FIG. 1 is a simplified functional block diagram of the processor control modem of the invention.

Referring to FIG. 1, a simplified block diagram of the modem of the invention is shown. Data is received at data input 60 in analog form. Although not necessarily limited thereto, it will be assumed for purposes of explanation that the data input will be an 1800 Hz carrier employing differential phase shift keying (DPSK) 8 phase modulation, and having a data rate of 4800 bits per second (bps) as is well known in the art, and that an 8-bit microprocessor will be used. The analog data input signal is processed appropriately by data input 60 and sampled in analog-to-digital (A/D) converter 65 with each sample converted to a binary word therein. Each binary word is fed sequentially to the 8-bit data bus (D-bus). As will be discussed in more detail hereinafter, the digitized signals will be demodulated by the microprocessor in combination with the logic circuits shown between the D-bus and the 8 bit Y-bus. The demodulated data appears on one of the outputs of discrete output circuits 125. Although the exemplary system utilizes an 8-bit D-bus, it is obvious that other processors may be used such as 12 or 16 bit bytes which would require a larger D-bus.

Locally generated digital data is input to discrete input multiplexer(MUX) 50 which is advantageously provided to significantly increase the internal processing speed as will be discussed below. The digital data modulates an 1800 Hz carrier with 3 bits at a time being processed. Each of the eight possible 3-bit combinations is assigned one of eight phase angles. These operations are performed digitally by RALU 10 utilizing the various peripheral circuits. The digitized DPSK data will be output to the Y-bus which drives digital-to-analog (D/A) converter 125 whose output is appropriately filtered and processed by data output circuits 70 for transmission via the output line.

Above the D-bus are control panel switches 85 which include configuration straps. The Y-bus also drives displays 80. Also shown above the D-bus is the modem clock 145 which supplies appropriate high speed timing to the various digital and logic circuit devices between the D-bus and the Y-bus. As indicated, a zero phase clock signal CK-0 and a 180° phase clock signal CK-1 is available from clock 145 for use in the various logic circuits.

The modem processor comprises an 8-bit central processing unit (CPU) having a register arithmetic logic unit (RALU) 10, a 1024×32 program memory (P-ROM) 95 with a 10 bit program address generator (PAG) 100, an interrupt subsystem (ISS) 120, a 512×8 coefficient memory (C-ROM) 20, a 256×8 data memory (D-RAM) 40, and a quarter square multiplier circuit 30 including a 16 bit squares memory (SQM) and an accumulator with 16 bit resolution, plus the necessary decoding and gating circuits to access the peripheral devices. Preferably, the modem processor is made up entirely of bipolar devices. Instructions are held during execution in a pipeline-type register which allows the next instruction to be read out from the P-ROM 95 at the same time. RALU 10 may be implemented with various available microprocessor devices. However, I prefer to use the 2901A 4-bit bit slice processor and manufactured by Advanced Micro Devices, Inc., and described in their catalog AM-PUB 003, dated 1979, with two units connected to form a CPU with the required precision plus some double precision capabilities. As will be discussed more fully below, the 2901A includes a 16-word, two-port register file, an ALU which can execute 16 arithmetic and logic instructions, a Q-register which can be used as a working or extension register, a shifting mechanism, and a source multiplexer which permits eight different combinations of operand sources to be specified for input to the ALU. One of the operand sources is the D-input to the 2901A, which provides the means for operating on data from external devices. The 2901A is controlled by 18 instruction bits which are divided into appropriate fields. The preferred instruction format for the 2901A utilizes a source code to specify the source combination, an operation code, a result destination code and two address codes; $A_i$ which addresses a port A register and $B_j$ which addresses a port B register. I prefer to use an 8×02 control store sequencer as manufactured by Signetics and described in their catalog entitled "1976 Data Manual" for the PAG 100 along with logic for providing jump addresses to the PAG 100 and for gating test signals into it. The PAG 100 generates a 10 bit address and performs all the well-known functions of a program address generator, including conditional skip, jump, subroutine jump, return jump, and unconditional push-and-pop commands in addition to increment operations.

The P-ROM 95 output directly drives the R-bus which furnishes instruction bits to the PAG 100 and its related logic. This arrangement allows PAG instructions to be executed before they are clocked into the instruction register 90, thus avoiding the delay associated with the pipeline. The interrupt subsystem 120 is associated with program address generation and receives pulses from the transmit clock 135 and receive clock 140 which are implemented with countdown chains to produce 9600 pulses per second which is the sampling rate for the transmitter and receiver processing. Each time a sampling pulse arrives, it disables the ISS and causes the PAG 100 to go to address 000. This address provides a program which tests the appropriate discrete input line to determine whether the interrupt was caused by the receive or transmit pulse and jumps to the indicated program. The ISS is not reenabled until the end of the selected program which prevents interrupting during either the transmit program or the receive program thereby eliminating the need for saving addresses or status when recognizing an interrupt.

The C-ROM circuits 20 and the D-RAM circuits 40 provide memory capacity for the system. The C-ROM 20 stores such data as filter coefficients, sine/cosine tables, conversion tables, and miscellaneous constants. The RALU 10 supplies addresses to the coefficient address register in the C-ROM circuits 20 to access the memory. The D-RAM in the high speed RAM circuits 40 is a 65 ns memory used to hold signal samples as well as miscellaneous control variables during various stages for processing. The D-RAM includes a novel addressing structure which provides efficient location-independent addressing for the algorithms that are used to implement digital transversal filters, equalizers, and recursive filters. Advantageously, the same set of ROM instructions may be used to execute all filters using the same algorithm, even though the variables associated therewith are located in different places in the D-RAM. This scheme is known as a sequential/displacement type addressing.

As will be apparent hereinafter, the modem of the invention requires a large number of multiply, add, and store operations to produce digital filtering. A quarter-square multiplier 30 having a high speed squares memory (SQM) and accumulator are used to implement these operations. The multiply algorithm used for this purpose is based on the so-called quarter square relationship:

$$\frac{(A + B)^2 - (A - B)^2}{4} = AB$$

The SQM output and accumulator are 16 bits wide. The accumulator output of the quarter square multiplier 30 is connected to the D-bus by two sets of tristate buffers which allow the accumulator output or the accumulator output divided by four to be read into the control processor 10. This facilitates scaling in the equalizer update algorithm among other uses.

The modem of the invention utilizes a discrete input/output (I/O) with the discrete output circuits 125 allowing single output lines to be turned on and off with a single instruction according to the state of the sign bit of the Y-bus. Similarly, the discrete-input multiplexer circuits 50 allows single input lines to be input into the RALU 10 and to set an entire word to ZEROs or ONEs with a single instruction. The discrete-input multiplexer circuits 50 also is used to bring in the state of the bitwise AND, and the bitwise OR and the bitwise EXCLUSIVE OR operators via bitwise gates 150. These operate on the 8 bits of the Y-bus and are used to facilitate bitwise logic as explained more fully hereinbelow.

Figure 2:
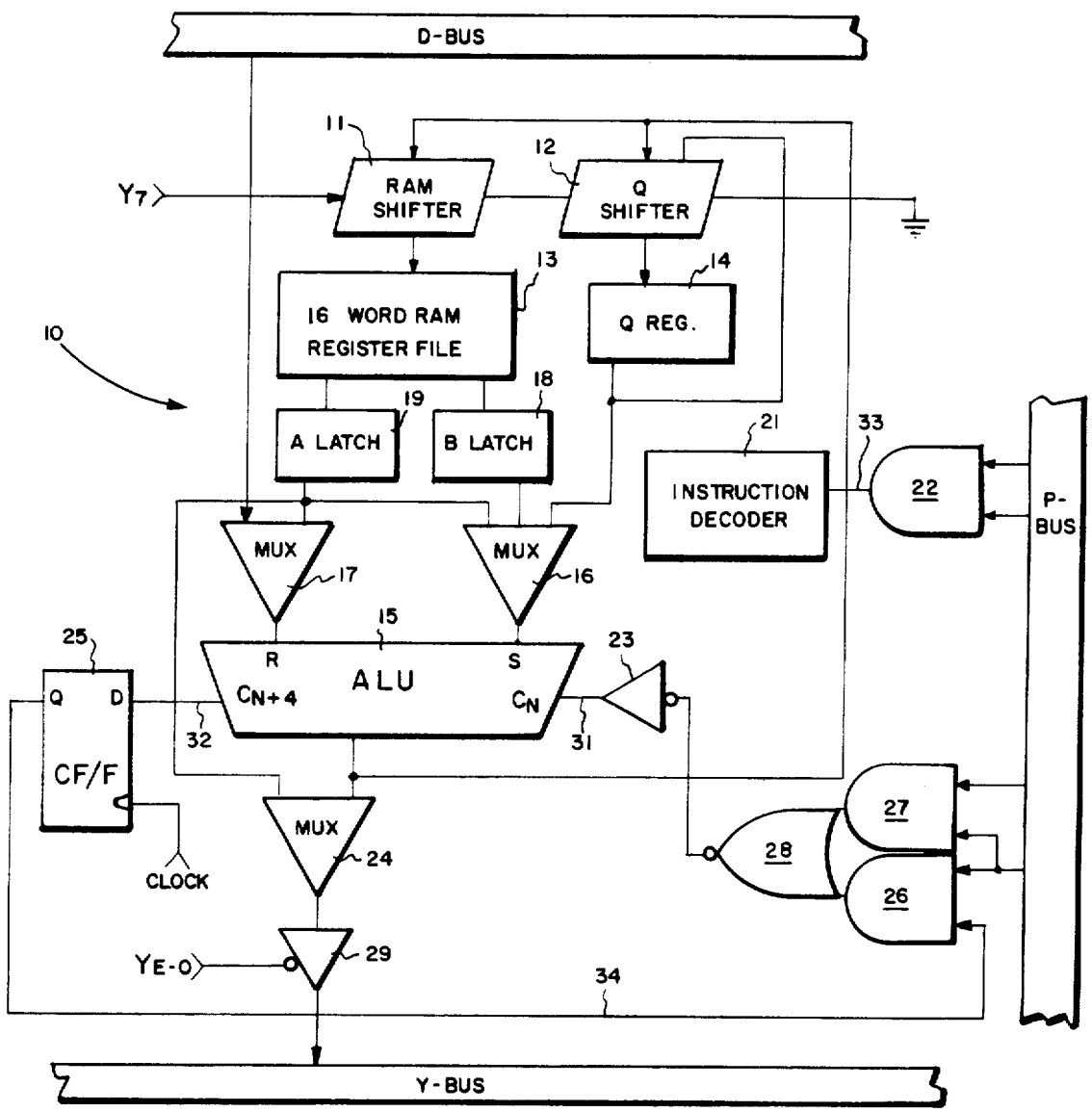
FIG. 2 is a more detailed block diagram of the register arithmetic logic unit of FIG. 1.

Turning now to FIG. 2, details of RALU 10 are shown along with certain external logic. As previously mentioned, the RALU of the microprocessor is formed by 2901 bit slice elements which provide the necessary precision for normal processing. Double precision operations may be used when required to provide an effective word length longer than the basic precision of the processor as may be necessary in the equalizier update and in some filter routines. The external logic is needed for add-with-carry and subtract-with-carry operations.

The arithmetic logic unit (ALU) 15 performs a set of arithmetic and logic operations on operands received from external devices and/or operands that are stored at internal registers. The internal registers comprise Q-register 14 which serves as an accumulator, and the 16 word register file 13 which can read out two independently addressed words at the same time via A latch 19 and B latch 18. ALU 15 can perform addition, both types of subtraction, logical AND, OR, EXCLUSIVE OR, EXCLUSIVE NOR, and MASK.

The following operand combinations can be selected: any pair of words from register file 13; one word from register file 13 and the other operand from the D-bus; one word from register file 13 and ZERO; one word from Q-register 14 and an operand from the D-bus; one word from Q-register 14 and ZERO; one word from Q-register 14 and an operand from the register file 13; and one word from the D-bus and ZERO.

The specific operation that ALU 15 performs at any given time is determined by the instruction bits to ALU 15. The instruction bits define the combination of sources that is to be used, the address for the two words in register file 13, the arithmetic or logic operation that is to be performed, and orders as to what is to be done with the result when the operation is completed.

When double precision is required, external carry/borrow logic is used to link two single precision operations. For example, assume that X and Y are two double precision numbers to be added together, and that the single word components of these numbers are $X_u$, $X_l$, $Y_u$, and $Y_l$. The double precision addition of X and Y consists of the following operations in which add-with-carry is represented by ADC:

$X_L$, ADD, $Y_L$
$X_U$, ADC, $Y_U$

The add-with-carry causes the carry from the $X_L + Y_L$ operation to be added into the sum of the $X_u + Y_u$ operation. This is done by saving the carry output CN+8 on lead 32 from all operations in carry flip-flop (CF/F) 25. The state of carry flip-flop 25 determines the state of carry-in lead 31 from inverter 23. This is accomplished by use of transmission gate 28, driven by AND gates 26 and 27 when the instruction bit to AND gates 26, 27 is HIGH, a carry on lead 34 is passed to lead 32, and when LOW, an arithmetic instruction bit is passed by gate 28 via AND gate 27. The latter case defines the normal arithmetic operations represented by the operation codes 0 through 7 in which the arithmetic instruction bit determines the state of carry-in. When gate 26 is enabled, both the add-with-carry and logic operations are defined. An instruction bit from the P-bus through AND gate 22 selects whether logic operations or arithmetic operations are to be performed by controlling the level on lead 33 in which a ONE defines a logic operation and a ZERO defines an arithmetic operation.

FIG. 2 also shows the interconnection of RAM shifter 11 and Q shifter 12 in the 2901A bit slice. This logic provides capability of double precision shifts useful in some double precision arithmetic operations. To accomplish this operation, the most significant input of RAM shifter 11 in the most significant 2901A bit slice is connected to the sign bit of the Y-bus which is designated $Y_7$. The least significant bit of the RAM shifter 11 on the least significant 2901A bit slice is connected to the most significant bit of the Q shifter 12 in the most significant 2901A bit slice. Referring to the figure, right shifts cause the sign to be extended with the least significant bit of the data going through the RAM shifter 11 to be shifted into the Q-register 14 and left shifts causing the most significant bit of the data in the Q shifter 12 to be shifted into the RAM shifter 11. The least significant bit of the Q shifter 12 of the least significant bit slice is connected to ground. Therefore, left shifts will shift ZEROs into the least significant bit of the Q shifter 12.

Figure 3:
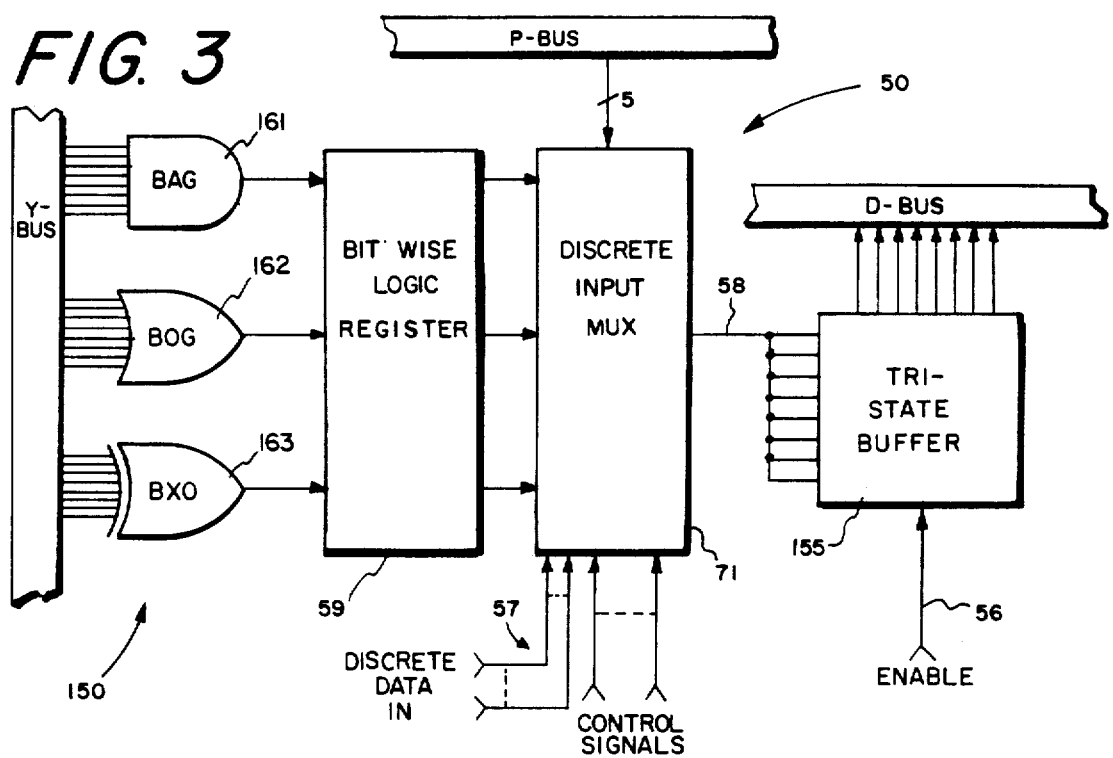
FIG. 3 is a more detailed block diagram of the discrete input multiplexer and bitwise logic circuits of FIG. 1.

As indicated with reference to FIG. 1, the novel bitwise logic circuits of the invention permit a significant increase in speed of certain necessary operations in the modem and a reduction in complexity of the circuits. It has been conventional in the prior art for microprocessors and computers that have instruction sets containing logic operations to use wordwise logic. This means that each bit in one operand is paired with the same bit in the other operand and the indicated operation then performed on the two. This method requires that the bits representing logic variables being operated on must occur in the same location in both operands. Since this coincidence does not often occur automatically, it requires various shift operations to bring it about. Consequently, logic operations in such prior art processors can be awkward and time consuming. Advantageously, in the present invention, a method is provided that performs logic operations on bit pairs within the same word or on pairs of bits from different locations in two different operands. This logic method is herein referred to as bitwise logic. In FIG. 3 a block diagram of the bitwise logic circuits formed by bitwise gates 150 and discrete-input multiplexer circuits 50 is shown. Although this logic may be applied to systems having any length words, it will be explained with reference to 8-bit words as an example. Three bitwise gates, bitwise AND gate 161 (BAG), bitwise OR gate 162 (BOG) and bitwise EXCLUSIVE OR gate 163 (BXO), each have eight inputs from the Y-bus and a single output, each of which connects to bitwise logic register 59 which has three corresponding outputs to discrete-input multiplexer 71. Leads 57 are discrete data input lines for inputting miscellaneous digitally generated data. Other input signals represent control signals and address leads.

As may now be recognized, each of the eight leads in the Y-bus is connected to one input of each gate 161, 162 and 163. The output of multiplexer 71 is a single lead 58 which is connected to all of the eight input leads of tristate buffer 155. Thus, when an enable signal is present on input lead 56 to tristate buffer 155, all lines in the D-bus go to the same state as that of the multiplexer output lead 58, which in turn reflects the state of the input lead selected by the control signals.

The operation of the bitwise logic will now be described. First, the AND function of any group of bits in a word can be formed by first wordwise ORing the word with a pattern which has ONEs in all bit positions which are not to be included in the AND function. Second, the OR and EXOR functions of any group of bits in a word can be formed by wordwise ANDing the word with a pattern that has ONEs in all the bit positions that are to be included in the functions. As is well known, the wordwise ORing and ANDing required are operations available in most standard microprocessors. Third, the value of the logic functions formed, as described above, is available to the processor as a word with all ONEs or all ZEROs. This permits the word to be added to or subtracted from another word which implies that the function has the numerical value of $-1$ when true and 0 when false. It can also be loaded as all ZEROs or all ONEs into a register. Finally, it can be operated on by one of the wordwise logic operations available in the processor.

To illustrate the steps in the logic operations, assume that $A_i$, $B_j$ and $C_k$ represent single bits in the words A, B, and C respectively, and that $P_i$, $P_j$ and $P_k$ are the binary patterns used to select bit locations i, j, and k, respectively. To perform the operation $A_i$ and $B_j \rightarrow C_k$ the steps are as follows:

1. A, OR $P_i \rightarrow$ Y-bus
2. B, AND, BAG $\rightarrow$ Temp 1
3. Temp 1, AND $P_j \rightarrow$ Temp 1
4. C, AND $P_k \rightarrow$ Temp 2
5. Temp 1, OR, Temp 2 $\rightarrow$ C The above are also the steps required if more than one bit each from A and B are to be used in the AND function. Without the bitwise logic operation, the number of steps required to perform the above general operation varies from 5 to 13, depending upon the location of the bits. If more than one bit per word is involved, the number of steps is greater.

Figure 4:
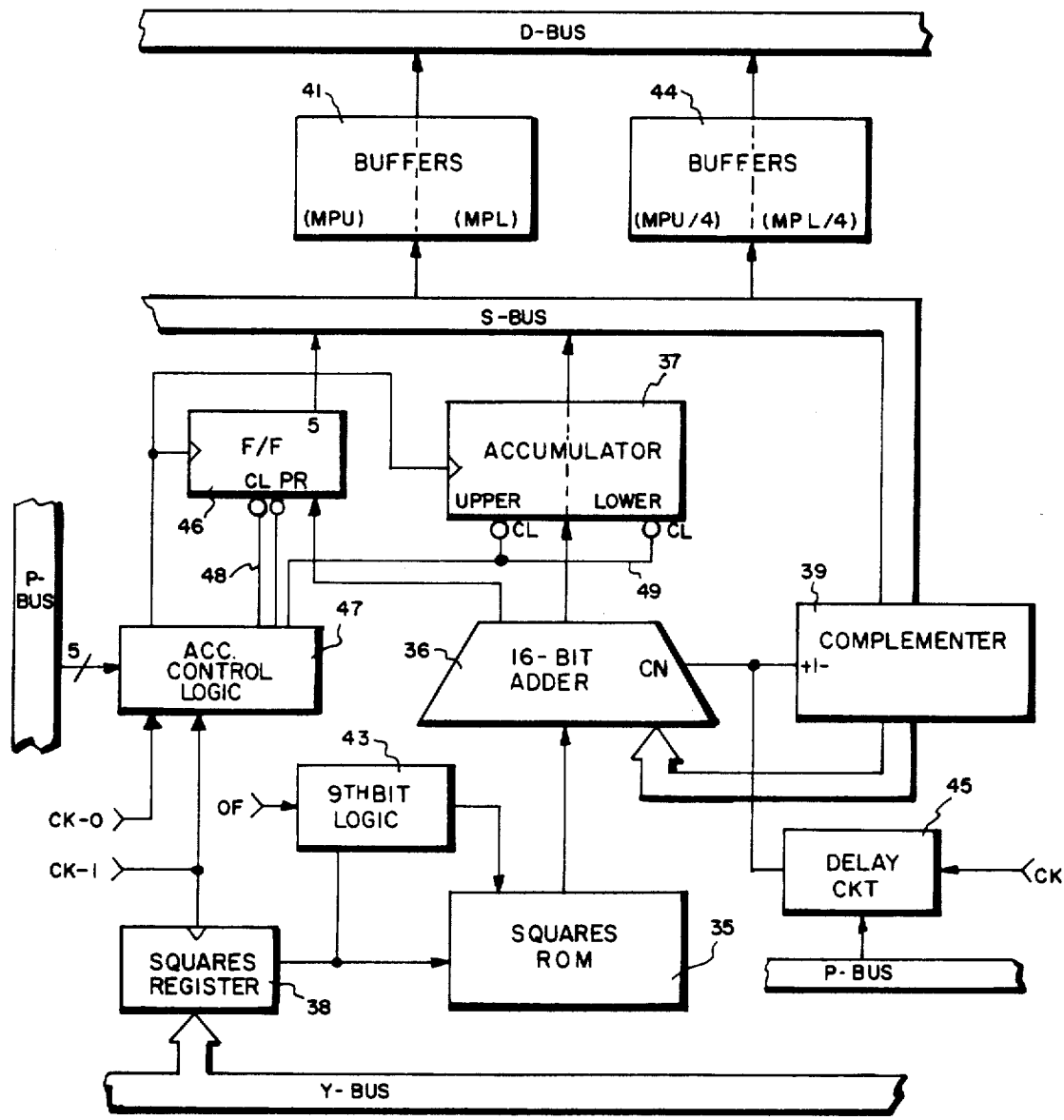
FIG. 4 is a more detailed block diagram of the quarter squares multiplier.

Turning now to FIG. 4, the novel squares memory and accumulator which make up quarter square multiplier 30 will be described. This novel feature allows successive multiply and accumulate operations to be performed at the rate of 1 every 400 ns with a minimum of circuitry. In prior art high speed digital multipliers, it has been common to utilize table look-up of partial products with subsequent addition, or generation of partial products by use of the Booth algorithm with subsequent addition. The quarter square multiplier (QSM) technique, based on the well known formulas $(A+B)^2 = A^2 + 2AB + B^2$ and $(A-B)^2 = A^2 - 2AB + B^2$, is used in the squares memory and accumulator to obtain the desired high speed operation. As previously discussed, the product AB is found by taking the difference of the squares of $A+B$ and of $A-B$ and dividing by 4. The quantities $(A+B)^2$ and $(A-B)^2$ can be generated by calculating the sum and difference and then looking up the squares. The size of the required look up table is $2^{n+1}$ where n is the number of bits resolution in A and B. For $n=8$ for example, the table is 512 words long and 16 bits wide. Since the additions and subtractions involved in the quarter square multiplying algorithm can be supplied by the ALU's in RALU 10, only a squares table needs to be provided. Therefore, the multiplier operation can be performed by the following steps:

1. Calculate $A+B$ and look up $(A+B)^2$.
2. Calculate $A-B$ and look up $(A-B)^2$.
3. Calculate $$\frac{(A+B)^2 - (A-B)^2}{4}.$$

Alternatively, the squares table can be replaced by a combination of logic circuits which generates the output patterns required to represent the squares of the input pattern.

The squares memory and the accumulator are shown in the functional block diagram in FIG. 4. The squares memory is provided by squares ROM 35 in FIG. 4 which may be a $512 \times 16$ bit memory which is used in conjunction with 16 bit adder 36 and accumulator 37. The sequence of operations for determining the product of two digital numbers is implemented by two successive instructions. The first instruction adds the two numbers in the ALU of FIG. 2 and delivers the sum to squares register 38 via the Y-bus. The second instruction computes the difference of the two numbers in the ALU and delivers the results to squares register 38 via the Y-bus. The data is delivered to squares register 38 at the end of each instruction on the positive going edge of a CK-1 clock pulse. While the ALU is computing A−B, the sum A+B is held by the squares register 38 and applied as an address to the squares ROM 35. ROM 35 accesses the appropriate square and passes it through the adder 36 into the accumulator 37 on the following CK-1 clock edge which also clocks the A−B output from the ALU into the squares register 38. During the next clock period, the square of the difference is then accessed by ROM 35 and presented to the adder 36. A complementer 39 under control of an add/subtract control signal from delay circuit 45 causes the accumulator contents to be subtracted from the output of ROM 35. This difference of the two squares is presented to accumulator 37 to be clocked in at the next rising clock edge. In case the algebraic sign of the result left in the accumulator 37 is wrong, it can be complemented when reading the accumulator into the ALU.

The instructions to load the accumulator and the add/subtract control signal are delayed by delay circuits 46 and 45, respectively, to compensate for the fact that the output of squares ROM 35 occurs toward the end of the instruction cycle falling into the one in which the accumulator load instructions and the add/subtract instructions were issued.

Returning now to squares ROM 35, as previously mentioned, this memory for the 8-bit case is 512 word by 16 bits wide providing 16 bits of output resolution. The 512 word table requires a 9 bit address to define all possible locations; however, the Y-bus delivers 8 bit words to the squares register 38. The ninth bit is generated via ninth bit logic 43 from an overflow signal (OF) from the ALU logic of FIG. 3 and the sign bit from the squares register 38. This logic operation creates a proper state for the ninth bit of the required address. The squares table in ROM 35 is organized such that addresses from 0 to 255 are treated as positive numbers and the entries corresponding to these numbers are the squares of the numbers. Addresses 256 to 511 are treated as 256's complement numbers, i.e., the entry for address 257 is the square of 255, the entry for address 258 is the square of 254, and so on until the entry for address 511 which is the square of 1. In this manner, all numbers positive or negative produce positive square outputs. As will be apparent, when the invention is implemented using a higher bit rate processor, a larger memory and larger word table would be used.

Accumulator 37 consists of an upper and lower register and uses flip-flop 46 to facilitate the control of round-off. Output 5 from flip-flop 46 acts as the most significant bit in the lower register, except that its clear and preset are independently controlled by a CLEAR round-off bit and a SET round-off bit from control logic 47. This controls whether the product out of the upper register is truncated or rounded off. If the round-off bit is SET, it has the effect of adding one-half of the least significant bit to the upper register which is the same as rounding off the number in that register.

When double precision or truncated single position products are required, the 5 output from flip-flop 46 is cleared so that ZERO is added to the upper register. The accumulator control logic 47 decodes the instruction bits from the P-bus to generate the various accumulator control signals discussed above. The output of accumulator 37 is referred to as the S-bus and connects to tristate buffers 41 and 44 which have their outputs connected to the D-bus. Buffers 41 and 44 may be controlled to output the upper or lower accumulator registers to the D-bus representing the product or the product divided by 4. Thus, either value is available and is especially useful in scaling operations required in equalizer up-date calculations.

Figure 5:
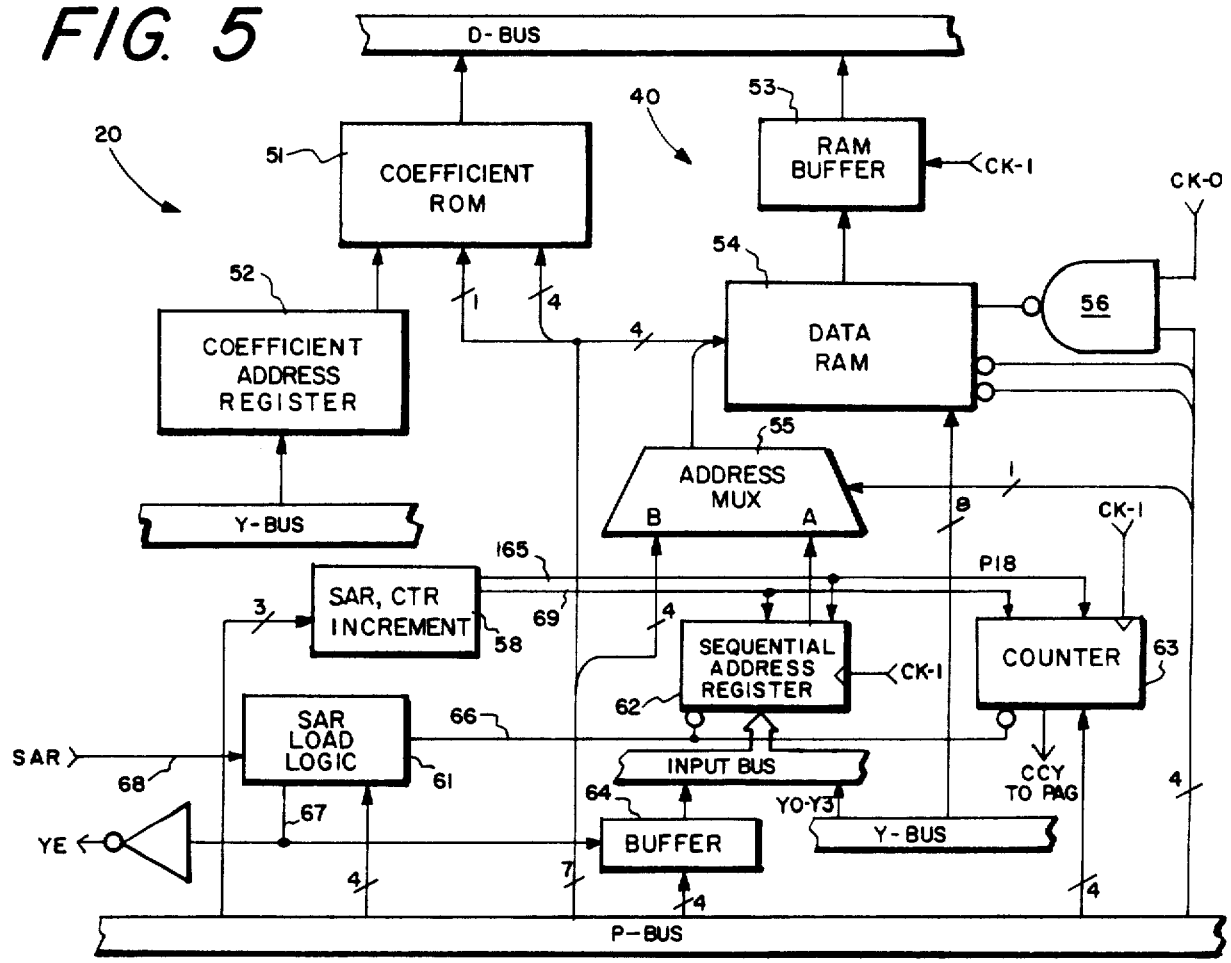
FIG. 5 is a more detailed block diagram of the coefficient read only memory circuit and the data random access memory circuit of FIG. 1.

The coefficient ROM circuits 20 and the high speed RAM circuits 40 are shown in block diagram form in FIG. 5. Coefficient ROM 51 stores various data required such as filter coefficients, sine/cosine tables, conversion tables, Grey code data, and miscellaneous constants. Coefficient ROM 51 is addressed by coefficient address register 52 which is loaded from the Y-bus. In addition, an instruction bit from the P-bus is used as the high order address bit. In order to access a word from coefficient ROM 51, an address is first loaded into coefficient address register 52 with one instruction and a second instruction then used to read the output of the coefficient ROM 51. Data RAM 54 is the main storage location for modem samples and other volatile data. The data RAM 54 is read into RALU 10 via RAM buffer 53 and the D-bus. Data is written into data RAM 54 from the control processor via the Y-bus. Two basic modes of addressing are provided for data RAM 54. The first mode is random addressing in which four instruction bits from the P-bus provide the upper half of the address and four other instruction bits provide the lower half from the P-bus via the B input of address multiplexer 55. The second mode is termed sequential/displacement addressing. Here, the lower half of the address is taken from the sequential address register (SAR) 62 via the A input of address MUX 55 and the displacement address is taken from four instruction bits from the P-bus. When the sequential address register 62 is used, it may be incremented by the instructions from the Y-bus which access data RAM 54. This acts as indexed addressing with automatic increment. Whenever the sequential address register 62 is incremented, counter 63 is also incremented to provide a CCY output to the program address generator 100 to indicate when a loop has been executed a preset number of times. As may be understood, counter 63 is the basic loop control counter for the system.

As shown in FIG. 5, the upper half of the data RAM address is provided by four displacement bits from the P-bus for this mode. Therefore, for every state of the sequential address register 62, any one of 16 locations in memory can be specified by the instructions. This novel feature of the invention is extremely useful in writing location-independent codes to execute highly repetitive algorithms such as required in recursive filters, transversal filters, and equalizer taps.

The sequential address register 62 can be loaded from four instruction bits from the P-bus or from the lower four bits of the Y-bus, Y0 through Y3. The SAR load logic 61 is responsive to the combination of instruction bits that is required to activate the sequential address register load signal on lead 66. The load signal is provided when the SAR signal on lead 68 is zero which occurs when sequential address register 62 is loaded from the Y-bus, or when load logic 61 receives a load jump command via the P-bus. The load jump command also produces an output on lead 67 which enables buffer 64 inputting four bits from the P-bus to the input bus for sequential address register 62. The output on lead 67 also causes ALU output enable signal YE, which is normally LOW, to go HIGH which takes the ALU in control processor 10 off the Y-bus during the time that the four P-bus bits are connected to it. Incrementing of the sequential address register 62 and counter 63 is controlled by lead 165 and lead 69 responsive to three bits from the P-bus via the SAR and counter increment circuits 58.

Figure 6:
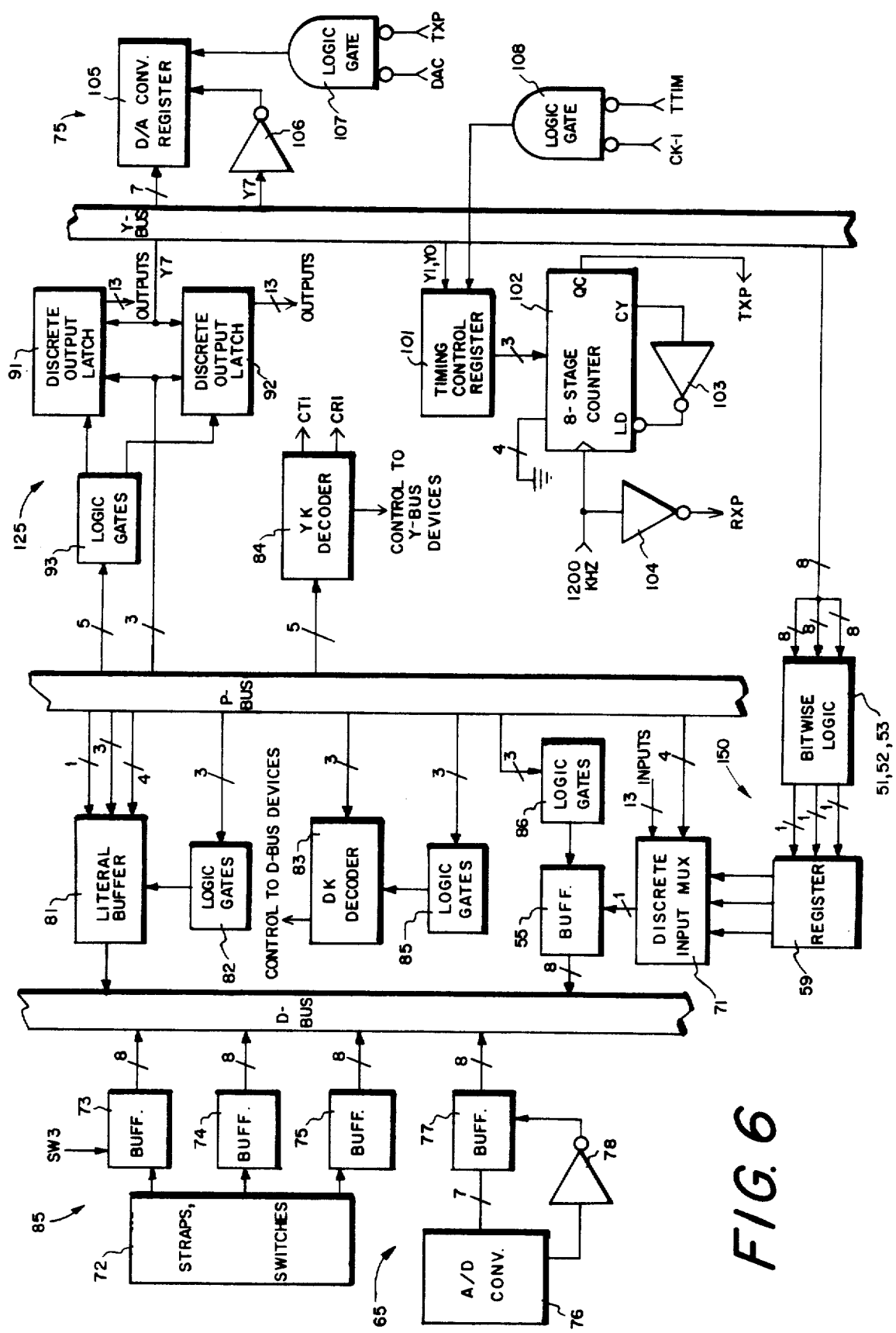
FIG. 6 is a detailed block diagram of the peripheral elements of the modem of FIG. 1 indicating the addressing thereof.

Turning now to FIG. 6, various peripheral elements of the modem of the invention are shown in block diagram form and indicating their address decoders. The peripherals include devices that either supply data to the D-bus to the RALU or accept data from the Y-bus of the RALU. Data may be input the RALU by two types of input devices. One type is an 8-bit data source which when addressed places all bits in parallel onto the D-bus and are known as DK devices. The DK devices include A/D converter 76, the literal input buffer 81, and the configuration straps and switches 72 in addition to the accumulator 37, the data RAM 54 and the coefficient ROM 51 previously discussed. The data is received by the RALU from the D-bus and processed as words. In the case of the switches and the straps, individual bits are extracted and processed.

In some time-critical routines, the task of extracting bits for processing is too lengthy. Advantageously, the invention overcomes this problem through the use of the discrete inputs which provide a way to bring single bit variables into the RALU as word variables so that they can be processed immediately without wasting time in bit extraction. This operation is accomplished by bringing such single bit lines through the discrete-input multiplexer 71 whose output puts a ZERO or a ONE on all bits of the D-bus according to whether the selected variable is low or high. The selected variable is defined by four address bits into MUX 71 from the P-bus and into logic gates 86 by three other bits from the P-bus. As discussed earlier, buffer 55 which is enabled by logic gates 86 has its 8 inputs tied together such that the parallel 8 outputs to the D-bus will all have the same state. As may now be understood, a selected line into discrete-input multiplexer 71 will set all of the bits in a specified RALU register to either ZERO or ONE with a single operation.

Discrete input MUX 71 also handles the bitwise logic outputs from bitwise logic 51, 52 and 53 into register 59 whose output is fed to MUX 71. As described in more detail above, a logic function of any combination of bits within a word can be transferred to any bit or bits in another word with a minimum number of steps.

The control panel switches and configuration straps 72 are input to the RALU via the D-bus through buffers 73, 74 and 75 as DK inputs, in which each individual line is connected to a line in the D-bus by means of tristate buffers 73, 74 and 75.

Literal buffer 81 appears as a peripheral on the D-bus. The literal is defined directly by instruction bits from the P-bus.

DK decoder 83 is controlled by logic gates 85 and six instruction bits from the P-bus which enables the devices connected to the D-bus.

There are also two types of outputs in the system, the YK outputs and the discrete outputs. The discrete outputs are associated with the relatively high speed external interface leads, for example the received data output, the transmitter clock and the receiver clock. These outputs are provided by the discrete output circuits 125 comprising latch 91 and latch 92 controlled by logic gates 93. Latch 92 is an optional addressable latch to implement a second external interface when required. An instruction bit will select between discrete output latch 91 and discrete output latch 92 and three other instruction bits select one of the 8 bit-latches in either of the latches 91 or 92. The state of the selected bit-latch is determined by Y7 from the Y-bus. With this arrangement, it is possible to set or reset an external line with a single instruction according to whether the byte variable in the processor is positive or negative. The YK decoder 84, controlled by five instruction bits from the P-bus, is used to enable all of the devices connected to the Y-bus and to strobe them when the data from the ALU is specified by the instruction to go to that device. YK decoder 84 also produces signals CT1 and CR1 for clearing the transmit and receive interrupt circuits. The transmit clock rate of the modem system is controlled by timing control register 101 by means of a variable modulo counter with a modulo of 125±1. 8-stage binary counter 102, which normally would have a modulo of 256, is connected so that the carry output (CY) presets the counter via inverter 103 such that each time after it carries, it returns to some number determined by the preset. The preset is determined by timing control register 101 which controls the three least significant bits of the preset. The upper five bits of the preset are always 10000. Register 101 is controlled by bits Y0 and Y1 providing four preset values 0, 2, 3 and 4. These numbers, in effect, subtract from modulo 128, which is the nominal range of the counter, producing effective modulos of 124, 125 and 126 or a nominal speed, a slow speed, and a fast speed. An identical arrangement is provided for controlling the received clock rate.

The output to the digital/analog converter 75 goes to holding register 105 with inverter 106 for inverting the most significant bit Y7 of the Y-bus. This is necessary to make the digital/analog converter respond properly to the two's-complement information it receives. As will be noted with respect to the analog-to-digital converter 65 connected to the D-bus, the most significant bit output from A/D converter 76 is inverted by inverter 78 for proper processing in the ALU.

Figure 7:
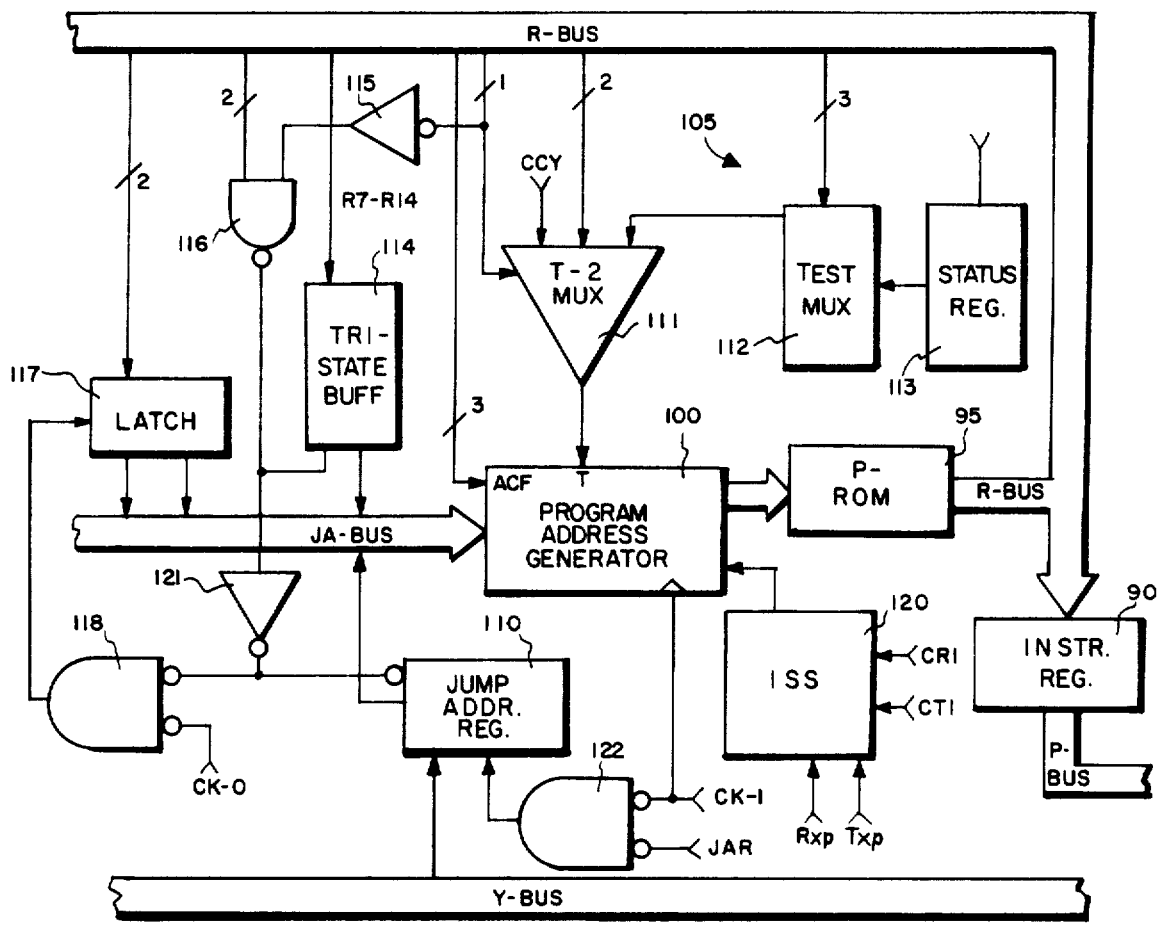
FIG. 7 is a more detailed block diagram of the program address generator and the program read only memory circuits of FIG. 1.

The program address generation system for the modem of the invention will be explained with reference to the block diagram of FIG. 7. The main element is program address generator 100 which is preferably an 8X02 control store sequencer which executes a set of eight instructions under control of the address control function (ACF) leads from the R-bus. The eight instructions that the program address generator 100 executes are the well-known operations conditional skip, increment, conditional branch to loop, return jump, conditional subroutine jump, push stack, conditional jump, and reset.

The T input shown for program address generator 100 is the conditional test input which determines whether conditional instructions are executed or not. If the T input is HIGH a conditional instruction is executed, and if T is LOW, a normal increment to the next address is carried out. The signal provided to the T input is selected by test MUX 112 and T2 MUX 111 under control of four bits from the R-bus. One condition which can be selected is "T always high" which provides for unconditional jumps.

When a jump instruction is executed, the low order bits of the jump address can come either from the jump address register 110 or the R-bus via tristate buffer 114. Tristate buffer 114 gates the address bits from the R-bus onto the jump address (JA) bus. The top bits of JA are always provided by the latch 117 set by bits from the R-bus whenever tristate buffer 114 is enabled. Which address source is used in a particular jump command is controlled by the state of three other instruction bits from the R-bus. When these three bits have the state 011, the R-bus is selected as the source. All other combinations select the jump address register 110 as the source. Jump address register 110 supplies a 10 bit address to the program address generator 100 made up of the lower 8 bits from the jump address register and the upper 2 bits from latch 117. Thus, indirect jumps through the jump address register 110 can be made within the 256 word page that is defined by the state of latch 117.

Figure 8:
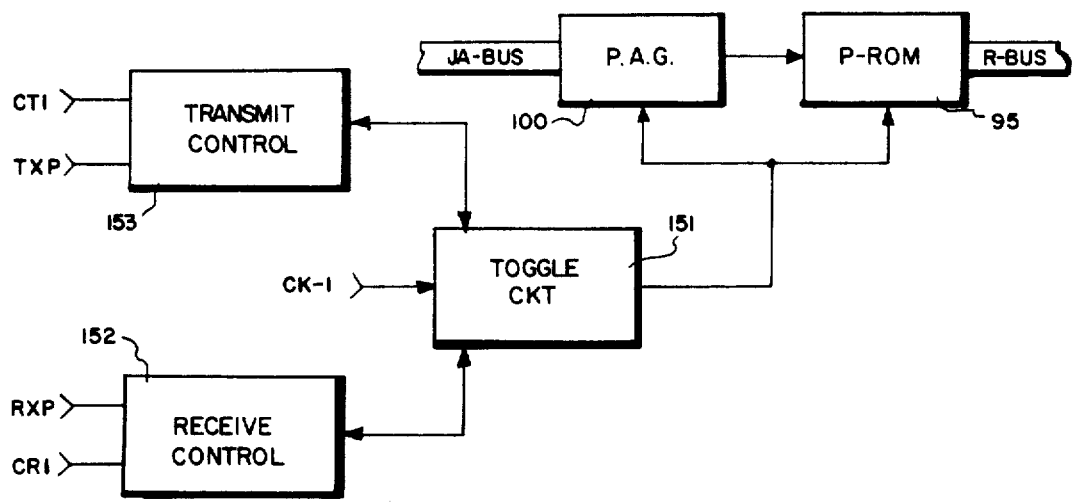
FIG. 8 is a simplified block diagram of the interrupt subsystem of FIG. 1 showing connection to the program address generator and program read only memory.

A block diagram of the interrupt subsystem 120 is shown in FIG. 8. Toggle circuit 151 includes a flip-flop that toggles back and forth at the instruction clock rate CK-1, which alternately enables transmit and receive controls 152 and 153 to monitor interrupt leads TXP and RXP. As may be noted with reference to FIGS. 1 and 6, the transmitter and receiver countdown chain outputs a receive interrupt clock signal RXP and a transmit interrupt clock signal TXP which are connected to inputs of controls 153 and 152, respectively. When a TXP or an RXP interrupt signal occurs, the respective control circuits inhibit toggle circuit 151. Thus, the toggle clock action of flip-flop 151 is disabled as long as the program is in an interrupt routine. Toggle 151 produces an interrupt vector enable signal into program address generator 100 which disables the PAG output and the HIGH 8 bits of the program ROM 95. This causes the program address generator 100 to restart the program ROM 95 from address ZERO where the interrupt service routine resides. After the interrupt signal is cleared, clock CK-1 to flip-flop 151 is again enabled and sampling of interrupt leads RXP and TXP is resumed. Clearing of an interrupt is accomplished by a LOW signal on lead CRI to clear flip-flop 103 and on lead CTI to clear flip-flop 152. These signals are produced by YK decoder 84 in FIG. 6 and are generated by an instruction from the P-bus after all critical interrupt processing has been completed.

A data modem, controlled by a microprocessor, has been described having an efficient high-speed computing capability. By virtue of an improved digital quarter square multiplier circuit, a novel discrete input multiplexer, a novel bitwise logic circuit, and improved data random access memory and an efficient interrupt subsystem, working in combination, the invention provides improved modulation and demodulation of digital data since more accurate algorithms for digital synthesis of filters, equalizers and other functions may be employed. Although specific arrangements of elements of the invention have been shown and described, these are for explanatory purposes only. Many variations and modifications will be obvious to those skilled in the art that will fall within the scope and spirit of the invention.

I claim:

1. In a modem for communication of digital data over a communications channel, said modem programmed to encode and decode data using 8 phase differential phase shift modulation, the improvement comprising:

(a) a modem processor (10, 90, 95, 100, 120, 20, and 40) including program memory means (95) having a control program stored therein and having a D-bus for input thereto of binary numbers in the form of bytes of digital data and a Y-bus for output therefrom of binary numbers in the form of bytes of digital data, said modem processor for performing logical addition and subtraction operations on such bytes of data;

(b) multiplying means (30) connected to said program memory means for performing high speed multiplication of a first binary number A and a second binary number B, said multiplier having a squares register (38), a squares memory table stored in a squares read only memory (35), an adder (36)/subtractor (39), and an accumulator (37), said squares register connected to said Y-bus for receiving in a first operation the sum $A+B$ and in a second operation the difference $A-B$ from said modem processor, said squares memory table receiving first said sum as address to the stored square thereof, said accumulator receiving said square, and in a second operation, said squares memory receiving said difference as an address to the stored square thereof, said adder/subtractor adding the negative of said square to the square stored in said accumulator, said accumulator thereafter producing a calculation of one-fourth the difference between said squares, said calculation being equal to the product of said first number A and said second number B, and said accumulator outputting said product onto said D-bus to said modem processor;

(c) bitwise logic circuit means (150) having a plurality of data byte inputs from said Y-bus and a single output for each one of said data byte inputs; and (d) discrete-input multiplexer means (50) connected to said program memory means having a plurality of single-bit inputs connected to said single outputs of said bitwise logic circuit means for receiving individual single data bits therefrom selected by said program memory means, said multiplexer means having a parallel byte output to said D-bus wherein said multiplexer means outputs a parallel data byte for each selected single input data bit in which each bit of the parallel data byte has the same logic level as the selected single input data bit thereby allowing the processor to sense the state of the selected input data bit and any bit of such output data byte;

whereby said modem processor performs logic operations on bits within a byte and on a bit in one location in one byte with a bit in another location in another byte within said processor.

2. The improvement as defined in claim 1 in which said discrete-input multiplexer means includes means that is controlled by said program memory means to cause a selected single-bit input out of a multiplicity of single-bit inputs connected to said discrete-input multiplexer to set all of the bits in a selected register in said register arithmetic logic unit in said modem processor to a logic level determined by the input bit.

3. The improvement as defined in claim 2 in which said bitwise logic circuit means includes:

a bitwise AND GATE (161) connected to said Y-bus for receiving a byte of data therefrom and a single output lead having a signal thereon reflecting the state of the AND function of all of the bits in said received byte to said discrete-input multiplexer means;

a bitwise OR GATE (162) connected to said Y-bus for receiving a byte of data therefrom and a single output lead having a signal thereon reflecting the state of the OR function of all of the bits in said received byte to said discrete-input multiplexer means; and a bitwise EXCLUSIVE OR GATE (163) connected to said Y-bus for receiving a byte of data therefrom and a single output lead having a signal thereon reflecting the state of the EXCLUSIVE OR function of all of the bits in said received byte to said discrete-input multiplexer means.

4. The discrete-input multiplexer means as defined in claim 2 which further comprises:
a multiplexer (71) having a plurality of single-bit inputs, a plurality of control signal inputs from said program memory means, and a single output;
a tristate buffer (55) having a plurality of inputs with all of said buffer inputs connected from said single multiplexer output, a parallel byte output connected to said D-bus and an ENABLE input for selectively enabling said tristate buffer onto said D-bus; and
logic gates (86) connected from and controlled by said program memory means for controlling the output of said tristate buffer.

5. The improvement is defined in claim 1 in which said modem processor comprises:
an instruction register (90);
a register arithmetic logic unit (10) controlled by an instruction word received from said instruction register, said word comprising a source code, an operation code, a result destination code, and two address codes;
a program address generator (100);
a program read only memory (95) with its address inputs connected from said program address generator for receiving instruction addresses therefrom and having an R-bus output for furnishing instruction words from said program read only memory, said instruction word being made up of a multiplicity of instruction bits, wherein some of said instruction bits being furnished to the program address generator for the purpose of controlling the generation of program addresses;
said instruction register connected to said R-bus for receiving some instruction bits from said instruction word being furnished by said R-bus and having a P-bus for outputting said instruction bits;
coefficient read only memory (20) for storing fixed data having an address input from said Y-bus and a data output to said D-bus, said Y-bus supplying addresses to said coefficient read only memory which have been calculated by said register arithmetic logic unit; and
a random access memory (40) for holding communication signal samples and control variables for processing, said random access memory having an input for receiving data from said Y-bus and an output for furnishing data to said D-bus, said random access memory utilizing a sequential/displacement type addressing in which some of the address bits are furnished to said random access memory of said P-bus as a displacement, and the remainder of the address bits are furnished to said random access memory from a sequential address register (62), said sequential address register receiving said remainder of the address bits from said Y-bus or said P-bus, said sequential/displacement addressing providing means for addressing communication signal samples and control variables for modem calculations.

6. The improvement as defined in claim 1 in which said modem processor includes:
a register arithmetic logic unit (10) having an arithmetic logic unit (15) and a multiplicity of registers (13, 14) for performing arithmetic and logic operations;
an interrupt subsystem (120) for generating interrupts to initiate the processing required for each operation of said processor; and
a coefficient read only memory (20) having filter coefficients stored therein and a data random access memory (40) for holding data samples.

7. The improvement as defined in claim 6 in which:
said D-bus and said Y-bus each is adapted to carry an 8-bit byte;
said arithmetic logic unit includes an 8-bit capacity;
said registers include sixteen 8-bit registers;
said program memory has at least a 1024×32 capacity and a program address generator (100) having means for producing a 10-bit address;
said coefficient read only memory has at least a 512×8 capacity; and
said data random access memory has at least a 256×8 capacity.

8. The 8 bit register arithmetic logic unit as defined in claim 7 which comprises two AM2901A type bit slice elements for providing 8 bit arithmetic in a first mode of operation and 16 bit arithmetic in a second mode of operation.

9. The improvement as defined in claim 7 in which:
said D-bus and said Y-bus accept 8-bit data bytes;
said squares memory table is a 512 word by 16-bit read only memory (35); and
said accumulator (37) includes an upper register and a lower register, said upper register containing the most significant half of the accumulator word and said lower register containing the least significant half of the accumulator word, and said upper and lower registers being connected to the D-bus through an upper and a lower tristate buffer (41), respectively, said buffers having outputs to the D-bus which are separately enabled, a round-off control flipflop which determines whether said upper register contains the truncated or the rounded-off most significant half of the accumulator word.

10. The improvement as defined in claim 9 which further comprises:
accumulator control logic (47) having an input for instruction bits from said P-bus said accumulator control logic connected to and controlling said accumulator; and 9th-bit logic (43) connected to said register arithmetic logic unit for receiving the overflow bit therefrom into said squares register for receiving a sign bit therefrom, said logic thereby producing a 9th address byte to said squares memory table.

11. The improvement as defined by claim 7 in which:
said modem processor includes a system clock (145) and a transmit countdown chain (135, 140) with variable modulos, said modulos being controlled by said modem processor to generate clock signals in proper synchronism with transmitted and received communication data, said clock signals generating a receive/interrupt signal and a transmit/interrupt signal when receive or transmit processing is required;
said interrupt system includes a toggle circuit (151) connected to alternately monitor for said receive/interrupt signal and for said transmit/interrupt signal, said toggle circuit connected to said P-bus wherein said toggle circuit is disabled when either a receive/interrupt signal or a transmit/interrupt signal is recognized, said toggle circuit connected to said program memory for resetting said program address generator when said toggle circuit is disabled; and said disabled toggle circuit is cleared by an instruction from said P-bus when interrupt processing is complete.

12. The improvement as defined in claim 7 in which said data random access memory includes:

random access memory means (54) connected to said Y-bus for receiving data bytes therefrom and connected to said P-bus for receiving instruction bits therefrom;

a sequential address register (62) connected to said P-bus and to said Y-bus for storing said sequential addresses and incrementing said sequential addresses;

an address multiplexer (55) having an output connected to said random access memory means, a first input connected to an output of said sequential address register for receiving four address bits and a second input connected to said P-bus for receiving four address bits, and a control input connected to said P-bus for receiving multiplexer steering control signals; and sequential address control logic (61) connected to said P-bus and to said sequential address register for controlling loading of said register from said Y-bus or from said P-bus, said data random access memory having a random addressing mode in which the address is formed by eight bits from said P-bus, and a sequential/displacement addressing mode in which the address is formed by four instruction bits from said P-bus and four sequential address bits from said sequential address register.

13. The improvement is defined in claim 12 in which said random access memory includes an output buffer (53) for furnishing data bytes to said D-bus.

14. In a digital modem having a modem processor for performing wordwise arithmetic and logic operations, a D-bus for input thereto of binary numbers in the form of bits of digital data and a Y-bus for output therefrom of binary numbers in the form of bits of digital data, and a control program bus, the improvement comprising:

discrete-input multiplexer means (50) having (a) a plurality of single-inputs (57) for receiving individual signal data bits from a plurality of sources, (b) a control input (5) from said control program bus, and (c) a parallel bit output (58) to said D-bus;

wherein said multiplexer means produces a parallel data bit for each single input data bit selected by a control signal on said control input, with each bit of such outputted parallel data bit having the same logic level as its respective single-bit input data bit.

15. The modem as defined in claim 14 which further comprises:

bitwise logic circuit means (150) having a bitwise AND GATE (161), a bitwise OR GATE (162), and a bitwise EXCLUSIVE OR GATE (163), each of said gates having an input connected to said Y-bus and a single output connected as an input to said discrete-input multiplexer means for permitting said register arithmetic logic unit to perform bitwise logic operations on bit pairs within the same word and on pairs of bits from different bit locations and two different operands in accordance with said control input.

16. The modem as defined in claim 15 in which said bitwise logic circuit means includes a bitwise logic register (59).

* * * * *